United States Patent [19]

Cha

[11] Patent Number: 5,745,348
[45] Date of Patent: Apr. 28, 1998

[54] PRINTED CIRCUIT BOARD COUPLING DEVICE FOR USE WITH A CATHODE RAY TUBE

[75] Inventor: Jong-tai Cha, Suwon City, Rep. of Korea

[73] Assignee: Samsung Electronics Co., Ltd., Rep. of Korea

[21] Appl. No.: 566,951

[22] Filed: Dec. 4, 1995

[30] Foreign Application Priority Data

Dec. 2, 1994 [KR] Rep. of Korea .................. 94-32620

[51] Int. Cl.⁶ ........................... H04B 1/03; H01J 29/82; H04N 5/645; H01R 13/627
[52] U.S. Cl. .................... 361/815; 313/404; 361/825; 348/825; 348/829; 348/830; 439/366
[58] Field of Search ........................... 313/402, 404, 313/403, 440, 456, 482, 261, 281, 292, 2.1; 315/3; 361/814, 815, 825, 817; 348/825, 828, 829, 830, 831; 439/56, 58, 168, 182, 235, 252, 471, 472, 366, 371, 799, 377, 76.1; 455/89, 90; 248/220.21, 224.8

[56] References Cited

U.S. PATENT DOCUMENTS

| 3,582,848 | 6/1971 | Ryder | 348/825 |
| 4,050,042 | 9/1977 | Anthony | 348/825 |
| 4,288,718 | 9/1981 | Blacker et al. | 313/404 |
| 4,590,540 | 5/1986 | Nicholson et al. | 361/815 |
| 5,321,516 | 6/1994 | Chen | 348/825 |

*Primary Examiner*—Donald Sparks
*Attorney, Agent, or Firm*—Banner & Witcoff, Ltd.

[57] ABSTRACT

A printed circuit board coupling device for use with a cathode ray tube is disclosed in which a coupling device is attached to one side of the circuit board by fastening devices. The coupling device includes a holder having generally ring shaped arcuate ribs extending from a support plate thereof. A support aperture is formed in the center of the ring shaped arcuate ribs and receives the base of the neck to encompass and fasten the center of the base, while fastening tabs and clips are integrally formed on the support plate to engagedly secure to the side of the circuit board, thereby evenly distributing the weight of the circuit board.

8 Claims, 3 Drawing Sheets

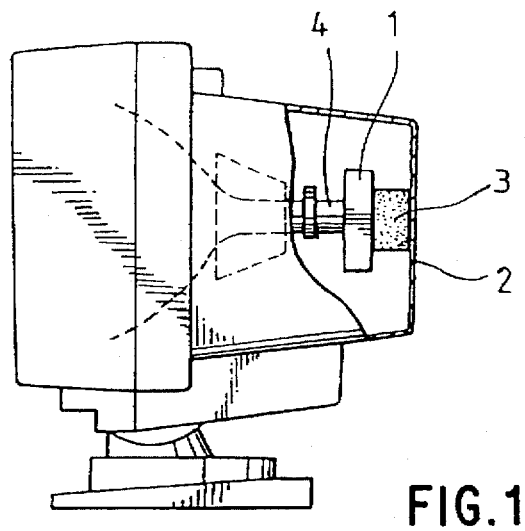
FIG. 1 PRIOR ART
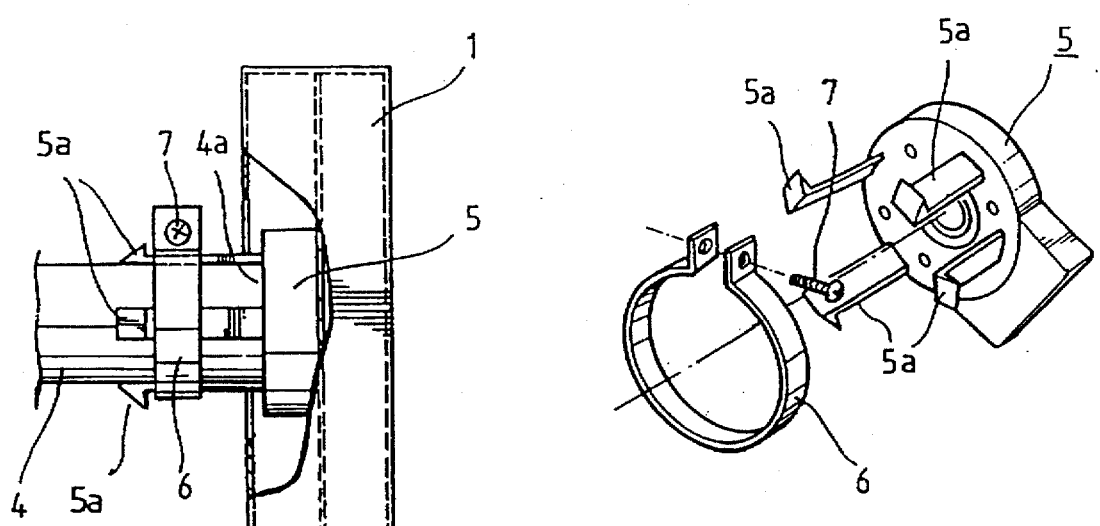
FIG. 2a PRIOR ART
FIG. 2b PRIOR ART

PRINTED CIRCUIT BOARD COUPLING DEVICE FOR USE WITH A CATHODE RAY TUBE

CROSS-REFERENCE TO RELATED APPLICATIONS

This application makes reference to, incorporates the same herein, and claims all benefits accruing under 35 U.S.C. 119 from an application entitled Printed Circuit Board Coupling Apparatus For A Cathode Ray Tube earlier filed in the Korean Industrial Property Office on 2 Dec. 1994, which was duly assigned Ser. No. 94-32620 by that office.

BACKGROUND OF THE INVENTION

The present invention relates in general to a structure for affixing a cathode ray tube within a monitor case, and more particularly, to a coupling device for affixing in a stable manner the base of the neck of a cathode ray tube to a heavy printed circuit board. The neck of the cathode ray tube is affixed to a coupling device which is installed on a printed circuit board.

The coupling device prevents the neck of the cathode ray tube, and more particularly, the junction of the base of the neck and the circuit board from cracking and failing due to the weight of electronic components mounted on the circuit board. By evenly distributing the weight of the circuit board device around the middle portion of the neck of the cathode ray tube, the coupling device enhances the reinforcing effectiveness in supporting the circuit board while simplifying the assembly process.

In a conventional neck attachment of a cathode ray tube to a circuit board, it is well known in the art that the junction of the attachment is prone to failure if a circuit board weighs more than 200 g. Currently, a variety of additional electronic components are mounted on the circuit board to improve the image quality formed on the screen of the cathode ray tube, thus causing the circuit board to increase in size and weight. As a result, the increased weight of the circuit board influences the junction bearing the weight by causing cracks to form, thereby weakening the connection between the circuit board and the neck of a cathode ray tube and reducing product reliability.

In an attempt to overcome these conventionally inherent drawbacks, one countermeasure is shown in FIG. 1 wherein a cushion member, such as a sponge 3, is compressively disposed between the backside of a rear case housing 2 and one side of a circuit board 1.

Another countermeasure contemplated is an attachment device as illustrated in FIG. 2, in which a joint structure is provided on a socket member 5 integrally formed on the circuit board 1. Socket member 5 connects with the base neck 4 of a cathode ray tube by using a clamp 6 and a screw 7 which securely fasten around the base of the neck adjacent the junction with the circuit board.

However, these prior art configurations as discussed above have certain disadvantages. The former countermeasure invites difficult and inconvenience in the assembly process because the sponge must be installed with a thickness greater than the area into which it fits within housing 2, since sponge 3 only properly works when compressed. The latter countermeasure may reinforce a binding force of the attachment between circuit board 1 and the neck of a cathode ray tube, however, the overhead weight of the circuit board 1 which hangs on the base 4a of the neck 4, makes assembly inconvenient and often creates a crack at the junction.

SUMMARY OF THE INVENTION

Therefore, it is an object of the present invention to provide a neck coupling structure for stably affixing the neck of a cathode ray tube to a printed circuit board.

It is another object of the present invention to provide a coupling device for coupling a printed circuit board to a cathode ray tube which is capable of evenly distributing the weight of the circuit board on the neck of the tube, thereby preventing the junction with the circuit board formed at the end portion of the base of the neck from being adversely impacted by the weight of the circuit board or failing.

It is still another object of the present invention to provide a coupling device which simplifies assembly and enhances quality and product reliability, at a low cost.

To accomplish the objects of the present invention, a neck attachment structure for a cathode ray tube is provided in which the base of the neck of the cathode ray tube is connected to a socket formed in a printed circuit board. The attachment structure comprises a coupling device for securely coupling the neck of the cathode ray tube to the circuit board in which assembly slots are provided around an insertion aperture at predetermined locations. The coupling device includes a holder for tightly fastening to the neck portion of the cathode ray tube using a snap protrusion, and pairs of tabs and clips for securing the coupling device to the assembly slots in the printed circuit board.

BRIEF DESCRIPTION OF THE DRAWINGS

The features of the present invention, which are believed to be novel, are set forth with particularity in the appended claims. The invention together with further objects and advantages thereof, may best be understood by reference to the following description taken in conjunction with the accompanying drawings, in the several figures of which like reference numerals identify like elements and in which:

FIG. 1 is an assembled sectional view of a general monitor case, illustrating a conventional printed circuit board coupling structure using a sponge;

FIG. 2(A) and 2(B) are, respectively, an assembled sectional view of the conventional printed circuit board coupling structure, and an exploded view of the attachment device used in FIG. 2(A);

DETAILED DESCRIPTION OF THE PREFERRED EMBODIMENTS

Figure 3:
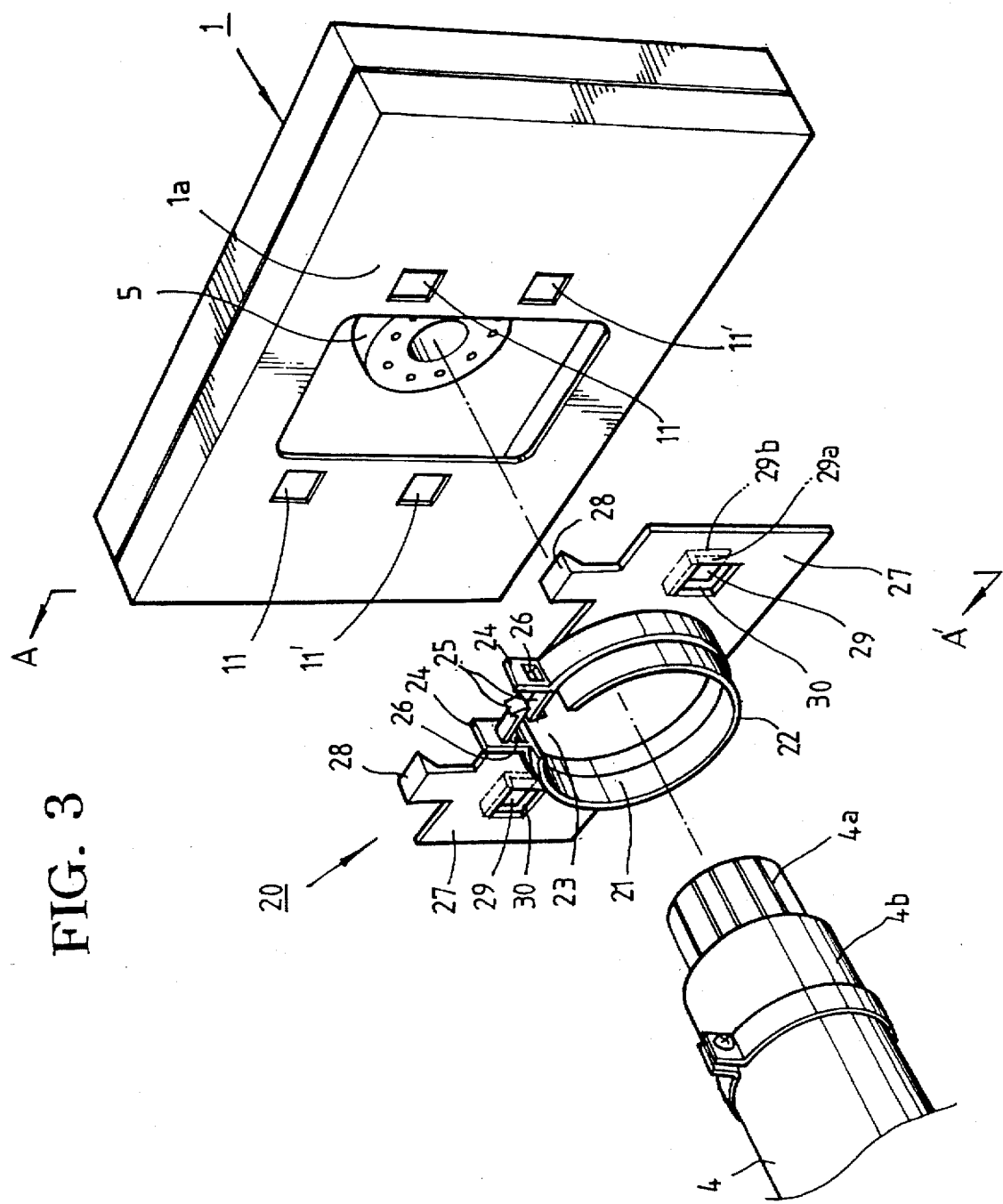
FIG. 3 is an exploded perspective view of a neck attachment structure of one preferred embodiment according to the present invention.
Figure 4:
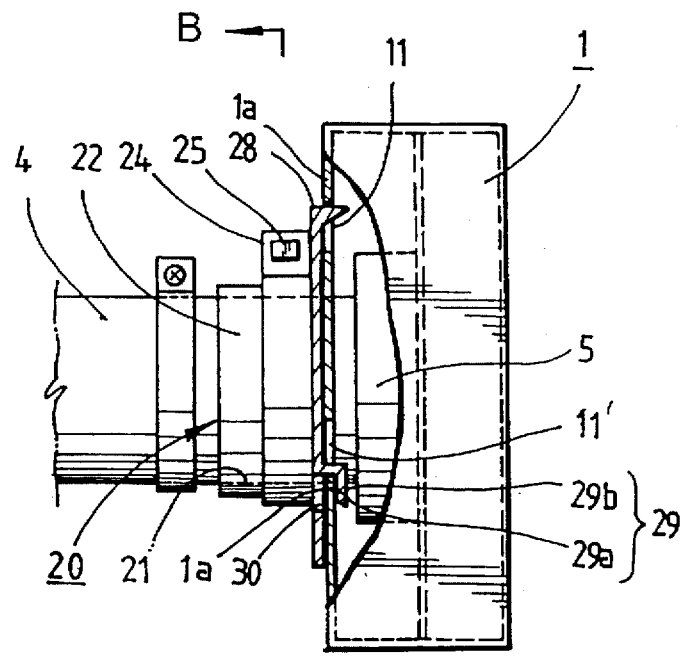
FIG. 4 is a cross-sectional view taken along line A—A' of FIG. 3.
Figure 5:
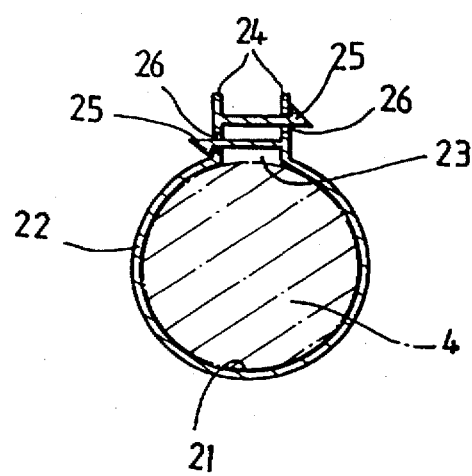
FIG. 5 is a cross-sectional view taken along line B—B' of FIG. 4.

Referring to FIG. 3, a neck 4 of a cathode ray tube to be housed in a monitor case (not shown) is provided with a base 4a which must be fed through a coupling device 20 and an insertion aperture in a printed circuit board 1 to connect with socket 5 formed in printed circuit board 1. A couple of pairs of upper and lower assembly slots 11, 11' are provided around the insertion aperture at predetermined locations, preferably in a substantially symmetric arrangement both vertically and horizontally.

Coupling device 20 includes holder 22 having a support aperture 21. The support aperture 21 is defined by generally ring shaped holder 22 which extends from the front side surface of coupling device 20. A pair of upstanding tabs 24 extend from holder 22 in a spaced apart, parallel manner. One snap protrusion 25 extends perpendicularly from one of the tabs 24, across the gap between the tabs 24, and into an insertion slot 26 in the opposing tab 24. A second snap protrusion 25 extends perpendicularly from the other tab 24, across the gap between tabs 24 and into a second insertion slot 26 in the opposing tab 24. Thus, a set of snap protrusions are laterally positioned in parallel and extend from respective upstanding tabs 24 in cross or opposing directions.

A pair of elastic tabs 28 are formed in spaced apart relationship along an upper edge of a supporting plate 27 of coupling device 20. Each elastic tab 28 is flush with supporting plate 27, extends vertically upward, has an upper bearing surface extending transversely from support plate 27 and is located to be inserted into one of the upper assembly slots 11. A pair of halt tabs 29, each having a groove 29a and locking tab 29b, shaped as a right-angled bracket, are integrally formed on the rearward side of supporting plate 27; and are located so as to be inserted and fitted into the pair of lower assembly slots 11' to ensure reliable engagement between printed circuit board and coupling device.

Support aperture 21 defined by arcuate ribs of holder 22 is aligned with the insertion aperture in printed circuit board 1, and halt tabs 29 of supporting plate 27 are fitted, from top to bottom, into corresponding ones of the pair of assembly slots 11' formed on the lower portion of front sidewall of printed circuit board 1. Then, elastic tabs 28 are press-fitted into corresponding ones of the upper assembly slots 11 with their upper bearing surfaces pressing against the upper edge of assembly slots 11 thereby securing coupling device on to printed circuit board 1. In the preferred embodiment, reference numerals 4b denotes the middle portion of the neck of a cathode ray tube, and 30 denotes an opening for the integrally molded tabs 29.

As a result, coupling device 20 is engagedly secured on to the front side wall of printed circuit board 1 by inserting the bottomside portions of lower assembly slots 11' of front sidewall 1a of printed circuit board 1 into groove 29a of halt tabs 29 and engaging elastic tabs 28 in press-fitting manner with upper assembly slots 11 so that top surfaces of tabs 28 are pushed downwardly by corresponding ones of upper edges of slots 11 in the sidewall, and simultaneously, engagedly locking the sidewall by locking tabs. Support aperture 21 is thus aligned with the insertion aperture formed in printed circuit board 1 so as to receive base 4a of neck 4. Base 4a then is fed through support aperture 21 to connect with socket 5 for enabling electrical continuity between a cathode ray tube and the circuit board. Once connected, upright tabs 24 are pulled toward one another to move first and second snap protrusions 25 in opposite directions and into insertion slots 26, thereby fastening the middle portion of neck 4 to surrounding holder 22. The attachment structure as disclosed above allows the weight of the weight of printed circuit board 1 to be loaded on the center of neck 4 via holder 22, evenly distributing the weight on the periphery of neck 4.

Consequently, according to the preferred embodiment of the present invention, the weight of a printed circuit board attached to the base portion of neck of a cathode ray tube is more evenly distributed, reducing the likelihood that cracks would be created at the junction of the base and circuit board and thereby enhancing product reliability. In addition, an easy fastening mechanism such as, for instance, snaps and halt tabs mating with slots are used to simplify the structure so that assembly process is facilitated, thereby enhancing production yield. From the foregoing detailed description, it will be evident that there are a number of changes, adoptions, and modifications of the present invention which come within the province of those skilled in the art. However, it is intended that all such variations not departing from the spirit of the invention be considered as within the scope thereof as limited solely by the claims appended hereto.

I claim:

1. A printed circuit board coupling structure for affixing the circuit board to a cathode ray tube having a neck in which one end of the neck is to be connected to a socket formed on the circuit board, said structure comprising:

coupling means for coupling the cathode ray tube to the circuit board, said coupling means having a holder for receiving the one end of the neck so as to secure the center of the neck with the weight of the circuit board evenly distributed about the neck, and a support plate having a pair of first and second fastening means integrally formed on it for attaching said coupling means to one side of the circuit board; and a plurality of assembly slots formed on said one side of the circuit board for engagement with at least one of said first and second fastening means.

2. The coupling structure as claimed in claim 1, wherein said first fastening means comprises a set of elastic tabs integrally formed along an upper edge of said support plate and arranged spaced apart from one another and symmetrically about said holder, and said second fastening means comprises a set of halt tabs arranged below said elastic tabs, whereby said first and second fastening means securely engage with corresponding one of said slots.

3. The coupling structure as claimed in claim 1, wherein a pair of upright tabs extend in perpendicular direction from both side ends of a cutout of said holder, and a snap protrusion and locking slot are formed on each of said upright tabs with each snap protrusion removable engagable with said locking slot in an opposing upright tab so as to fasten the center of the neck when assembled.

4. A printed circuit board coupling structure for affixing the circuit board to a cathode ray tube having a neck in which one end of the neck is to be connected to a socket formed on the circuit board, said structure comprising:

a side wall of the circuit board having an insertion aperture for receiving an end of the neck, a pair of upper assembly slots formed in said wall symmetrically about said insertion aperture and a pair of lower assembly slots formed in said wall symmetrically about said insertion aperture and below said upper assembly slots;

a coupling device having a support plate with a pair of upper tabs located for removable engagement in said upper assembly slots, a pair of lower tabs located for removable engagement in said lower assembly slots, and a neck supporting ring extending transversely from said support plate for receiving and supporting the neck of the cathode ray tube.

5. The coupling structure as claimed in claim 4 wherein said lower tabs are each formed in the shape of a right-angle bracket located to be slidably received behind and rest on an upper edge of a respective one of said lower assembly slots.

6. The coupling structure as claimed in claim 4 wherein said upper tabs each include an upper bearing surface extending transversely from said support plate and located to bear against an upper edge of a respective one of said upper assembly slots.

7. The coupling structure of claim 4 wherein a pair of upright tabs extend from said neck supporting ring in a spaced apart relationship, a snap protrusion extending from at least one of said upright tabs, and a locking slot being formed in at least one of said upright tabs for removable receiving said snap protrusion to secure the neck of the cathode ray tube to said neck supporting ring.

8. The coupling structure of claim 7 wherein a snap protrusion extends from each upright tab and a locking slot is formed in each upright tab.

* * * * *